June 20, 1933.  E. S. JOHNSON  1,914,724
AIR HEATER AND CIRCULATOR
Filed Oct. 13, 1931  2 Sheets-Sheet 1
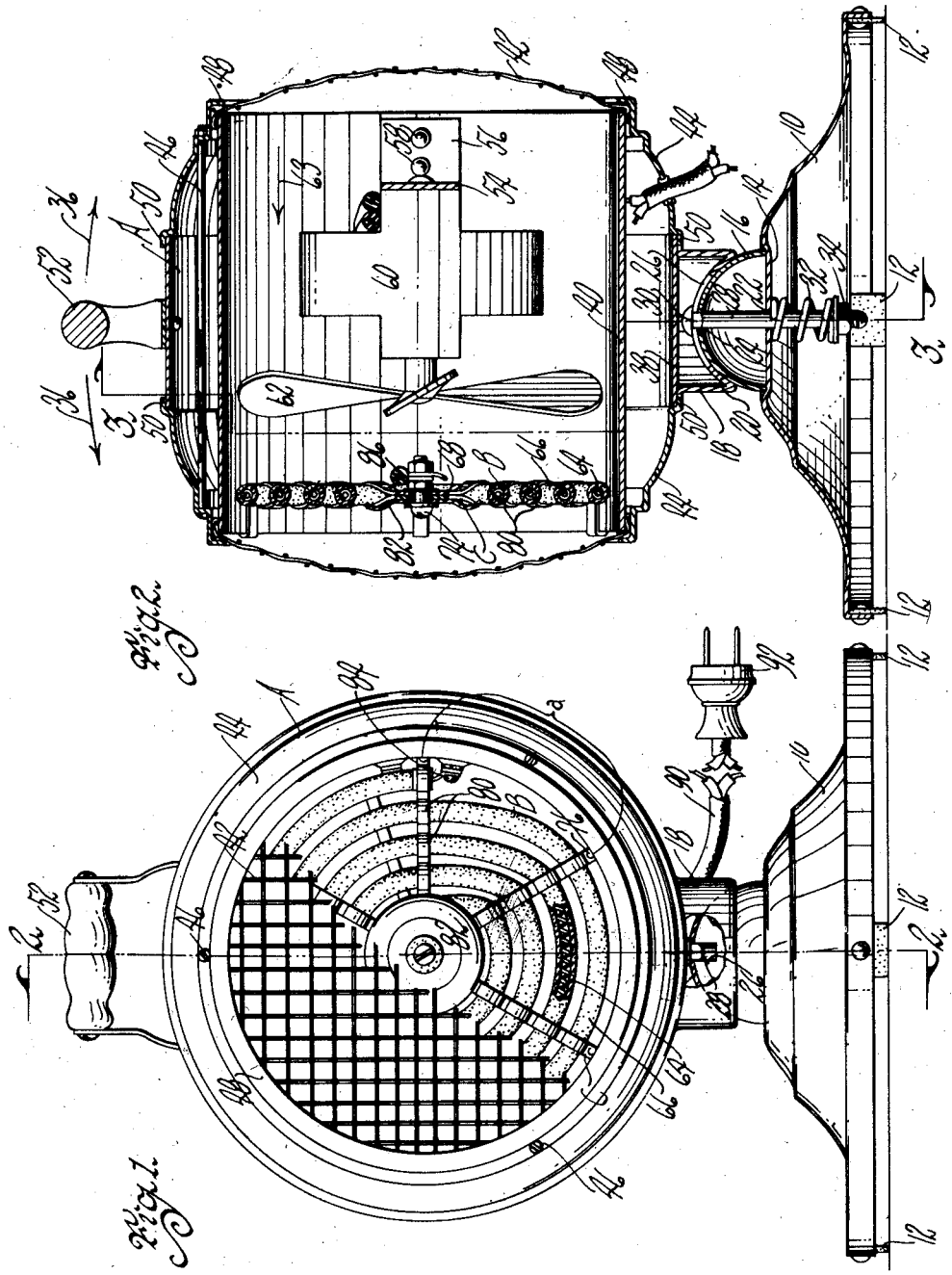
Inventor
Ernest S. Johnson
By Bair, Freeman & Sinclair
Attorneys

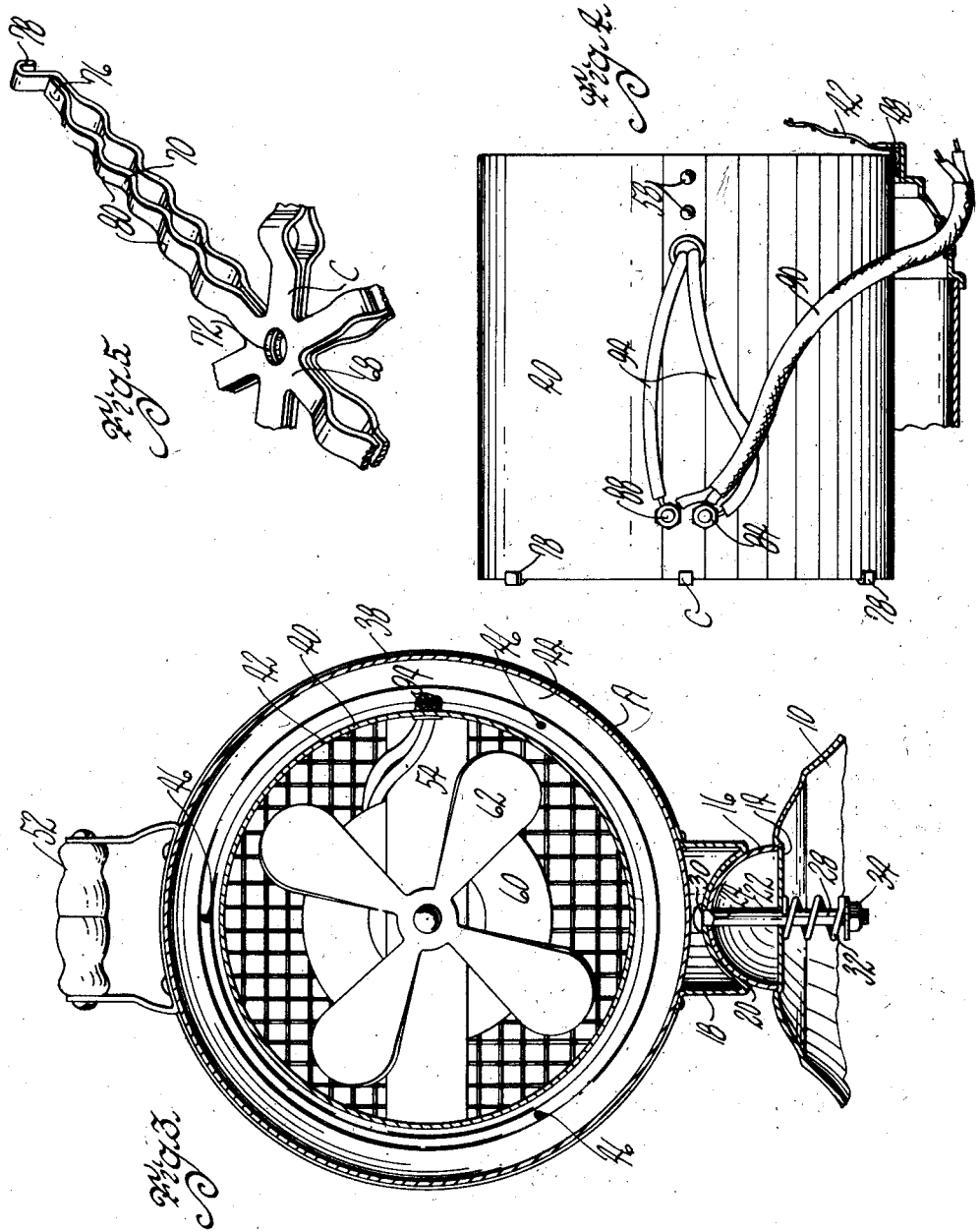

Patented June 20, 1933

1,914,724

UNITED STATES PATENT OFFICE

ERNEST S. JOHNSON, OF BELLEVILLE, ILLINOIS, ASSIGNOR TO KNAPP-MONARCH COMPANY, OF BELLEVILLE, ILLINOIS, A CORPORATION OF MISSOURI

AIR HEATER AND CIRCULATOR

Application filed October 13, 1931. Serial No. 568,548.

An object of my invention is to provide an electric appliance of simple, durable and inexpensive construction for heating and circulating air.

A further object is to provide a cylinder for confining a column of air which is circulated by a fan in the cylinder and a grid-like heating element substantially spanning the diameter of the cylinder for heating the air being circulated therethrough.

Another object is to provide a novel form of casing for the cylinder and a base therefor, with novel mechanism for mounting the casing on the base so that the air heater and circulator can be readily tipped to any desired inclination, as for instance when it is desired to direct the heated air toward or away from the floor.

A further object is to provide a novel support for a heating element, so that the element substantially spans the diameter of a cylinder through which air circulates and yet the heating element is of open construction so that the air can readily pass therethrough and be heated thereby.

A further object is to provide a spirally arranged heating element consisting of a coil of resistance wire embedded in an insulating cover, whereby metallic supports may be provided therefor without danger of short-circuiting the coils of the heating element.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a front elevation of an air heater and circulator embodying my invention.

Figure 2 is a vertical sectional view on the line 2—2 of Figure 1.

Figure 3 is a sectional view on the line 3—3 of Figure 2.

Figure 4 is an outside view of a cylinder and wiring connections used in my device; and Figure 5 is a perspective view of part of a heating element support which I utilize in my appliance.

On the accompanying drawings, I have used the reference numeral 10 to indicate a base. The base 10 has insulating feet 12 and is provided at its top with a depression 14. A hemispherical member 16 is positioned in the depression 14. A casing A has a bracket 18 provided with a ball-shaped socket 20 adapted to coact with the hemispherical member 16, as shown in Figure 2.

Openings 22 and 24 are provided in the base 10 and the hemispherical member 16, respectively. A slot 26 is provided in the socket 20. A bolt 28 extends through the slot 26 and the openings 24 and 22. The bolt 28 has a square shoulder 30 in the slot 26 to prevent turning of the bolt. Inside the base 10, a spring 32 is positioned on the bolt 28 and retained thereon by a nut 34.

From the construction of the parts just described, it will be obvious that the casing A can be tipped in the direction of either of the arrows 36 and will be frictionally held in any desired inclined position. The entire device, of course, can be rotated for directing the column of heated air being circulated in any direction.

The casing A comprises a band 38 encircling a cylinder 40. Perforated shields 42 are arranged over the ends of the cylinder 40 and these shields together with the cylinder are assembled relative to the band 38 by cap members 44 and tie bolts 46. The caps 44 have flanges 48 and 50 for engaging the shields 42 and the band 38, respectively.

A handle 52 is provided for convenience in carrying the device from one position to another and for adjusting it to any desired inclined position on the base.

Within the cylinder 40, I provide a cross bar 54 having feet 56 at its ends. The feet 56 are secured to the inner surface of the cylinder 40 by means of rivets 58 or the like.

An electric motor 60 is supported on the cross bar 54 and is provided with an air circulating fan 62. The fan 62, upon rotation, circulates air through the cylinder 40, preferably in the direction of the arrow 63.

A heating element B is provided for heating the air thus circulated. The heating element B comprises a spiral coil 64 of resistance wire embedded in a covering 66 of insulating material, such as fire clay or the like.

Supporting means is provided for the heating element B in the form of a pair of members C each having a hub-like center 68 and radial arms 70. Openings 72 are provided at the centers of the hub-like portions 68 for receiving a clamping bolt 74 which holds the members C in assembled position. The outer ends of the arms 70 may be spot-welded together, as indicated at 76.

The ends of the arms on one of the members C are hooked, as indicated at 78, for engagement over one end of the cylinder 40 for supporting the members C relative thereto. The perforated shield or screen 42 at such end of the cylinder 40 in conjunction with the cap 44 and the tie bolts 46 holds the members C in supported position.

Each arm 70 of each member C is provided with corrugations 80 adapted to receive the heating element B therebetween. The heating element may be concentrically arranged throughout the major portion of its path around the center of the cylinder 40 and spiraled from one corrugation to the other in the section a thereof, as indicated in Figure 1. The insulating cover 66 effectively prevents short-circuiting of the coils of the resistance wire 64 when the heating element is supported by the arms 70 which are preferably of metal.

One end of the resistance wire 64 may be secured to the bolt 74, which is suitably insulated from the members C and arranged through a washer 82 from which it is also insulated. The opposite end may connect with a terminal screw 84 extending through the cylinder 40 and insulated therefrom. A wire 86 connects the terminal screw 74 with a terminal screw 88 also extending through the cylinder 40 and insulated therefrom.

Supply wires from the cable 90 and connecting plug 92 are connected with the terminals 84 and 88 and these terminals are also connected with the motor through leads 94.

Whenever the plug 92 is electrically connected with a source of current supply, the motor 60 will be energized for circulating air longitudinally through the cylinder 40 and the heating element B will be energized for heating the air. The face of the insulating cover 66 will absorb most of the heat radiated from the resistance wire 64, but after a short period of time, the heat begins to radiate through the cover 66 and heat the air passing by the heating element.

The heating element is effectively insulated against short-circuiting thereof because of being supported by the metallic arms 70 and yet an inexpensive support is thus provided without assembly difficulties experienced with many types of heating elements.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In an air heater and circulator, a base, a band mounted thereon, a cylinder within said band, caps engaging the ends of said band and the ends of said cylinder, means for retaining said caps in such engagement and a heating element and an air circulating fan within said cylinder for circulating heated air longitudinally therethrough.

2. In an air heater and circulator, a base, a band mounted thereon, a cylinder within said band, caps engaging the ends of said band and the ends of said cylinder, perforated shields having edges held between said caps and the ends of said cylinder, means for retaining said caps in such engagement and a heating element and an air circulating fan within said cylinder for circulating heated air longitudinally therethrough.

3. In an air heater and circulator, a base, a band mounted thereon, a cylinder within said band, caps engaging the ends of said band and the ends of said cylinder, bolts extending through said caps to retain them in such engagement and a heating element and an air circulating fan within said cylinder for circulating heated air longitudinally therethrough.

4. In a device of the class described, a base surmounted by a ball-shaped top, a cylinder having a ball-shaped socket coacting therewith, a slot in said socket and an opening in said ball-shaped top, a bolt through said slot and said opening, spring means to cause said ball-shaped top and said socket to frictionally engage with each other and an electrical appliance in said cylinder.

5. In a device of the class described, a base, a hemispherical member thereon, openings in said base and in the top of said hemispherical member, an electrical appliance having a socket for coaction with said hemispherical member, a slot in said socket, a bolt through said slot and said openings and spring means to cause frictional engagement between said hemispherical member and said socket.

6. In a device of the class described, a cylinder, a radial corrugated arms therein arranged in opposed pairs, a heating element supported in the corrugations of said arms, said arms having ends hooked over an end of said cylinder, a perforated shield over said ends, a casing for said cylinder having a flange engaging said perforated shield to hold it and the ends of said arms in position against said end of said cylinder and a fan for circulating air through said cylinder and said heating element.

7. In a device of the class described, a base having a depression, a hemispherical member in said depression, openings in said base and in the top of said hemispherical member, an electrical appliance having a socket for coaction with said hemispherical member, a slot in said socket and a bolt through said slot and said openings and retaining said base, hemispherical member and appliance in assembled relation to each other.

8. In an air heater and circulator, a base, a band mounted thereon, caps engaging the ends of said band, means for retaining said caps in such engagement and a heating element and an air circulating fan within said band and said caps for circulating heated air therethrough.

9. In an air heater and circulator, a base, a band mounted thereon, caps engaging the ends of said band, bolts extending through said caps to retain them in such engagement and a heating element and an air circulating fan within said band and said caps for circulating heated air therethrough.

ERNEST S. JOHNSON.